(12) United States Patent
Nehmadi et al.

(10) Patent No.: US 11,292,483 B2
(45) Date of Patent: Apr. 5, 2022

(54) MANAGING A CHANGE IN A PHYSICAL PROPERTY OF A VEHICLE DUE TO AN EXTERNAL OBJECT

(71) Applicant: VAYAVISION SENSING LTD., Or Yehuda (IL)

(72) Inventors: Youval Nehmadi, Nili (IL); Ronny Cohen, Ramat HaSharon (IL); Mark Wagner, Rehovot (IL); Moshe Langer, Nes Ziona (IL)

(73) Assignee: VayaVision Sensing, Ltd., Or Yehuda (IL)

( * ) Notice: Subject to any disclaimer, the term of this patent is extended or adjusted under 35 U.S.C. 154(b) by 58 days.

(21) Appl. No.: 16/287,259

(22) Filed: Feb. 27, 2019

(65) Prior Publication Data

US 2020/0062273 A1 Feb. 27, 2020

Related U.S. Application Data

(60) Provisional application No. 62/636,167, filed on Feb. 28, 2018.

(51) Int. Cl.
*B60W 50/08* (2020.01)
*B60W 40/12* (2012.01)
*G06K 9/00* (2006.01)
*B60W 50/14* (2020.01)

(52) U.S. Cl.
CPC .......... *B60W 50/085* (2013.01); *B60W 40/12* (2013.01); *B60W 50/14* (2013.01); *G06K 9/00791* (2013.01); *B60W 2530/10* (2013.01)

(58) Field of Classification Search
CPC .... B60W 50/085; B60W 40/12; B60W 50/14; B60W 2530/10; B60W 30/095; G06K 9/00791
See application file for complete search history.

(56) References Cited

U.S. PATENT DOCUMENTS

| | | | |
|---|---|---|---|
| 2008/0077327 A1* | 3/2008 | Harris | G01S 13/931 701/301 |
| 2010/0211247 A1* | 8/2010 | Sherony | B60W 30/1882 701/31.4 |
| 2014/0358429 A1* | 12/2014 | Shutko | B60D 1/245 701/458 |
| 2017/0120903 A1* | 5/2017 | Lavoie | B60W 30/18036 |
| 2017/0246990 A1* | 8/2017 | Rosenblum | G01S 13/931 |
| 2018/0114388 A1* | 4/2018 | Nagler | G07C 9/00309 |
| 2018/0293445 A1* | 10/2018 | Gao | G08G 1/16 |
| 2019/0176844 A1* | 6/2019 | Sedlmayr | G08G 1/162 |
| 2019/0219681 A1* | 7/2019 | Atsushi | G01S 7/411 |

\* cited by examiner

*Primary Examiner* — James J Lee
*Assistant Examiner* — Alexander George Matta
(74) *Attorney, Agent, or Firm* — Fish & Richardson P.C.

(57) ABSTRACT

A method for managing a change in a physical property of a vehicle due to an external object that is attached to the vehicle, the method may include receiving information regarding the external object and a relationship between the external object and the vehicle; wherein at least part of the information is sensed information that is sensed by a sensor; determining, by a vehicle computer and based on the information, an effect of the external object on the vehicle; and responding to the effect of the external object on the vehicle.

14 Claims, 19 Drawing Sheets

MANAGING A CHANGE IN A PHYSICAL PROPERTY OF A VEHICLE DUE TO AN EXTERNAL OBJECT

CROSS REFERENCE

This application claims priority from US provisional patent 62/363,167 filing date 28 Feb. 2018.

BACKGROUND

In some cases, user mount/connects external object on/to a vehicle. The element is external when at least part of the element is external to the vehicle. When element is mounted on the vehicle, the vehicle physical properties change. For example, the height, width and length of the space taken up by the vehicle, its weight and so on.

SUMMARY

There may be provided a method for managing a change in a physical property of a vehicle due to an external object that may be attached to the vehicle, the method may include: receiving information regarding the external object and a relationship between the external object and the vehicle; wherein at least part of the information may be sensed information that may be sensed by a sensor; determining, by a vehicle computer and based on the information, an effect of the external object on the vehicle; and responding to the effect of the external object on the vehicle.

The responding may include adapting at least one autonomous driving pattern of the vehicle to the effect of the external object on the vehicle.

The responding may include planning a future driving path of the vehicle based on the effect of the external object on the vehicle.

The responding may include alerting a driver about the effect of the external object on the vehicle.

The responding may include preventing a vehicle from progressing along a driving path that was drivable without the external object and may be undrivable with the external object.

The method may include sensing the sensed information by one or more vehicle sensors.

The one or more vehicle sensors may be mounted on a top of the vehicle.

The one or more vehicle sensors may include a weight sensor.

The one or more vehicle sensors may include an active sensor.

The one or more vehicle sensors may include a passive sensor.

The method may include receiving at least a part of the sensed information from an external sensor that may be not attached to the vehicle.

The determining of the effect of the external object on the vehicle may be based on the sensed information and based on design information related to the external object.

The determining of the effect of the external object on the vehicle may be based in part on a height profile of a path on which the vehicle drives.

The responding may include updating a high definition map about the effect of the external object on the vehicle.

The method may include receiving at least part of the information from the external object.

There may be provided a non-transitory computer readable medium that may store instructions for receiving information regarding an external object that may be attached to a vehicle and a relationship between the external object and the vehicle; wherein at least part of the information may be sensed information that may be sensed by a sensor; determining, based on the information, an effect of the external object on the vehicle; and responding to the effect of the external object on the vehicle.

The responding may include adapting at least one autonomous driving pattern of the vehicle to the effect of the external object on the vehicle.

The responding may include planning a future driving path of the vehicle based on the effect of the external object on the vehicle.

The responding may include alerting a driver about the effect of the external object on the vehicle.

The responding may include preventing a vehicle from progressing along a driving path that was drivable without the external object and may be undrivable with the external object.

The non-transitory computer readable medium may store instructions for sensing the sensed information by one or more vehicle sensors.

The one or more vehicle sensors may be mounted on a top of the vehicle.

The one or more vehicle sensors may include a weight sensor.

The one or more vehicle sensors may include an active sensor.

The one or more vehicle sensors may include a passive sensor.

The non-transitory computer readable medium may store instructions for receiving at least a part of the sensed information from an external sensor that may be not attached to the vehicle.

The determining of the effect of the external object on the vehicle may be based on the sensed information and based on design information related to the external object.

The determining of the effect of the external object on the vehicle may be based in part on a height profile of a path on which the vehicle drives.

The responding may include updating a high definition map about the effect of the external object on the vehicle.

The non-transitory computer readable medium may store instructions for receiving at least part of the information from the external object.

DETAILED DESCRIPTION OF THE DRAWINGS

Figure 1:
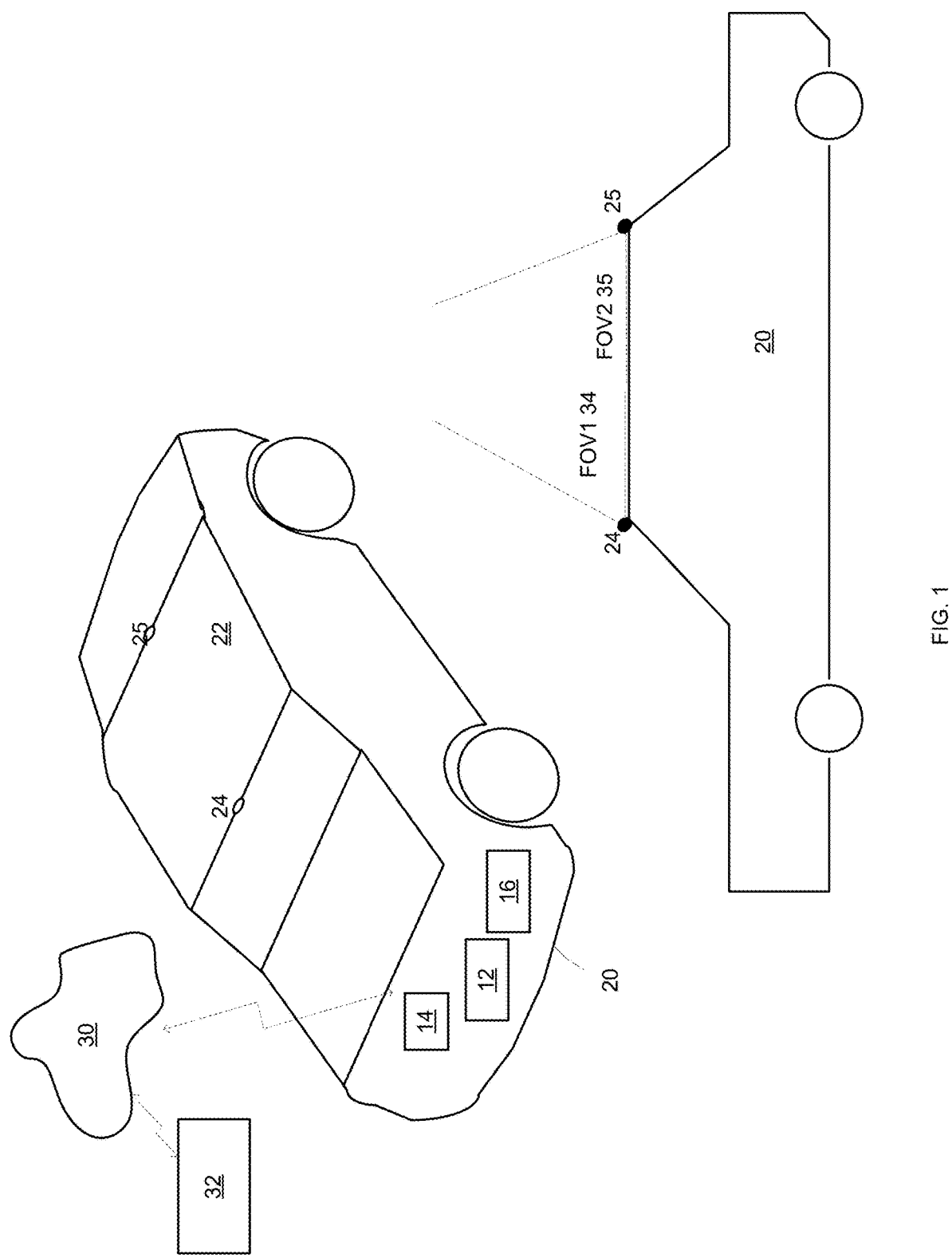
FIG. 1 illustrates an example of a vehicle, network and computerized system.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with object s, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method.

Any reference in the specification to a system should be applied mutatis mutandis to a method that may be executed by the system.

The term vehicle may be a land vehicle such as a truck, a private car, and the like.

An autonomous driving system may take into account changes introduced by the external element. For example, a vehicle with a height of 180 cm that carries, on its roof, a bike of height 100 cm then the effective height of the vehicle and bike is 280 cm. The method may determine that the vehicle cannot pass under a bridge, or enter a parking garage, whose height is less than (slightly above) 280 cm.

Without the bike, it would have been sufficient to report an obstacle if the headroom were less than 180 cm.

Another consequence of changing the vehicle load is that it alters the vehicles dynamics Where an unloaded vehicle may have been able to come to a stop in 10 seconds, it may now require 15 seconds. Such information is critical to ensure accident free autonomous driving.

For the purposes of this document, a change to a vehicle's physical properties relates to changes introduced due to the external element.

There may be provided a system and method capable of detecting a change to the vehicle's physical properties, and/or estimate the change in the vehicle's physical properties and/or update the autonomous driving system with the change.

Detection can use sensors mounted on the vehicle (vehicle sensors), or not. Sensors mounted on one or other vehicle can be used to detect the element that is mounted on the vehicle, may send information about the element, directly or indirectly, to the vehicle.

The estimation of the change in the vehicle's physical properties can be an accurate measurement, or calculation of safety limits. Safety limits may define where the vehicle can pass.

The update to the autonomous driving system of the changed vehicle physical properties can be manual or automatic.

The autonomous driving system may be the vehicle's driving system, other vehicle's driving systems, or a dynamic map.

A vehicle's physical properties can be changed in many ways:
  a. Attaching an object to the vehicle.
  b. Mounting a bike, or other external object on the roof.
  c. Mounting a bike on the rear of the vehicle.
  d. Attaching a trailer to the vehicle.
  e. Mounting containers on trucks.
  f. Attaching snow chains.
  g. Replacing a damaged tire with a non-standard spare.
  h. Attaching a trailer to a truck.

Various examples of attaching an external object to the vehicle and/or examples of various sensors are listed in various figures and in the following text:

Mounting an external object on the rooftop of the vehicle

The system will detect changes to the vehicle's roof topography and report them to the autonomous driving system.

Problems that might be resolved by the system:
  a. Driving under bridges.
  b. Entrance into parking garages.
  c. Insufficient breaking distance.
  d. Miscalculation of trajectory when passing.

Examples of potential obstacles:
  a. House parking garage limited in height and width.
  b. Parking lot entrance, limited in height and width.
  c. Parking gate, limited in height.
  d. Bridge limited in height.

Detection

Detection of changes to the vehicle's physical properties can be by one or more sensors of the vehicle (or otherwise attached to the vehicle) and/or by at least one sensor that is not attached to the vehicle or belongs to the vehicle. Any sensor may be a camera, an image sensor, a radar, a LIDAR system, acoustic sensor, a sonar, and the like. For example:
  a. Sensor on the vehicle that senses the presence of an external object
  b. Cameras on the vehicle that take images of the external object
  c. Active sensors (lasers) on the vehicle that can detect a change in the roof topography.
  d. Weight sensors on the vehicle that measure the weight of an external element.

e. Cameras not on the vehicle that take images of the external object, such as phone cameras.

f. Weight sensors on the ground beneath the vehicle.

Estimation

Estimation of the changes to the vehicle's physical properties can be accurate measurements, or estimation of safety limits. Estimation can be made by combinations of sensors on the vehicle, and not on the vehicle.

If the entire external object is captured in cameras mounted on the vehicle, then its physical dimensions can be measured accurately from the images The combination of a weight sensor on the vehicle and an image from a phone can be used to estimate the dimensions and weight of the external object.

If only part of the external object can be sensed, then safety limits for the external object can be estimated from a combination of camera images and active sensors.

The external object estimations may be be reported to the autonomous driving system.

If all of the estimations are made from sensors on the vehicle, then the estimation itself can be reported automatically to the vehicle autonomous driving system over the vehicle's communication buses (CAN bus) and through a vehicle's electronic control unit (ECU).

If estimations are made partly from information collected by sensors not on the vehicle, then they can be entered manually into the autonomous driving system.

Alternatively, estimations can be passed directly and automatically, from an external application, such as on a phone, to the vehicle's autonomous driving system.

It may be useful to update a dynamic high density map with information about the changes to the vehicle's physical properties. This is in order to make the vehicle's own autonomous driving system aware of obstacles, such as low bridges, or dips in the road, that require changes to the vehicle's path planning Some obstacles, such as construction, may have been navigable for an ordinary vehicle, but not by a vehicle with extra external object. Alternatively, the vehicle or an external computerized system may evaluate the drivability of various paths based on the properties of the paths (especially width of passageways, height of passageways, radius of turns, curvature) and based on the new physical properties of the vehicle (including the external object).

Similarly, it may be useful to update other vehicles with the vehicle's new physical properties. For example, if the physical dimensions of the vehicle are different, greater clearance may be required for overtaking, or for driving in dense traffic.

In some systems, it may be possible for a human user to confirm, and edit, changes to the vehicle's physical dimensions before they are used by the autonomous driving system. In such a case, it should not be possible for the user to violate estimated safety limits.

It will be the task of the autonomous driving system to take into account changes to the vehicle's physical properties. This can include, changing the driving path to avoid obstacles, altering the motion control to account for longer stopping distances, and reporting hazards. Specifically, the autonomous driving system must report to the driver any instance in which changed physical properties may interfere with the vehicle's ability to safely maintain its planned or current trajectory. Alerts will vary in severity, depending on the situation. In the case of a risky but traversable roadway, the vehicle may alert a human driver to slow down. In the case of an impassable roadway, the vehicle may alert the driver to stop (or brake automatically).

Hazard alerts can be displayed on the vehicle's display, in any manner—for example—with colors indicating severity of the hazard: green would indicate no problem, yellow/orange for low severity alert, red for impassable. Hazard alerts can also be audible.

In any of the following figures the vehicle may include an autonomous driving system, an advanced driver assistance system, both systems or neither one of the systems. The number of vehicle sensor, the location of vehicle sensor, the fields of view of the vehicle sensors, the type of vehicle sensors and other components of the vehicle may differ from those illustrated in the figures. The vehicle may or may not communicate with a computerized system located outside the vehicle, may communicate with other vehicles, may communicate with user devices (such as smartphones) and the like. For simplicity of explanation only one figures illustrates the external computerized system and a network and only few figures illustrate various other components of the vehicle.

FIG. 1 illustrates a vehicle 20 that includes a roof 22, two vehicle sensors 24 and 25 mounted on the roof (and having fields of views FOV1 34 and FOV35 respectively) that cover the space above the roof.

The vehicle may communicate (through network 30—network being of any kind) with computerized system 32. The computerized system 32 may participate in various calculations/determination/estimation, may provide information such as maps, path curvatures, height of elements, and the like.

Vehicle is illustrated as including a driving system (autonomous or non-autonomous) 12, communication module 14 and vehicle computer 16. The driving system may be executed by the vehicle computer, may be a part of the vehicle computer, may differ from the vehicle computer, may control the vehicle computer and/or may be controlled by the vehicle computer.

Figure 2:
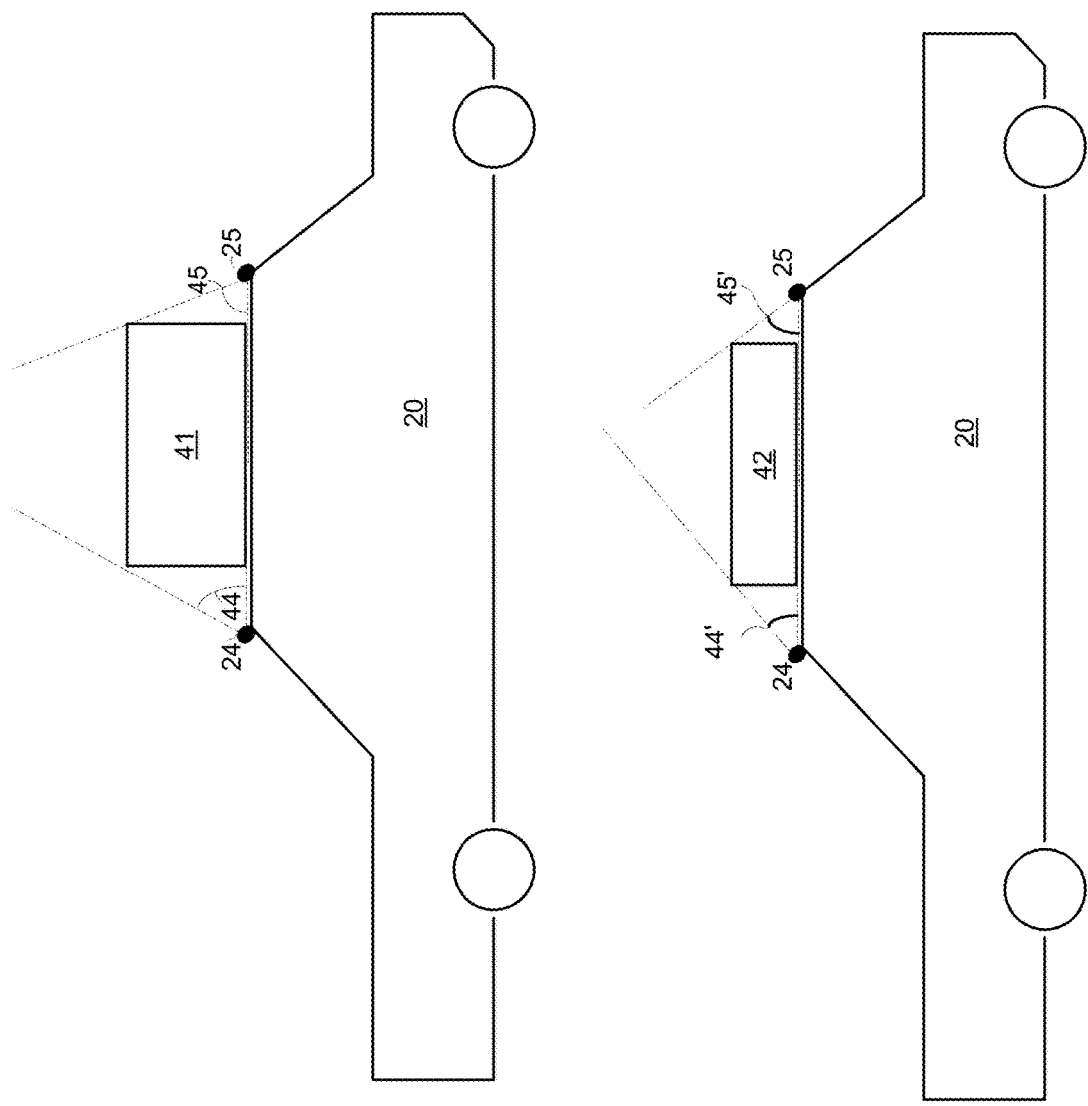
FIG. 2 illustrates an example of a vehicle, and an external object mounted to the top of the vehicle.

FIG. 2 illustrates a vehicle 20 and two external objects 41 and 42 mounted on the roof of the vehicle.

The dimensions of the external object 41 can be learnt from (a) the angle 44 between the roof of the vehicle and a virtual line that links first vehicle sensor 24 and the front top edge of external object, and (b) the angle 45 between the roof of the vehicle and a virtual line that links second vehicle sensor 25 and the rear top edge of external object 41.

The dimensions of the external object 42 can be learnt from (a) the angle 44' between the roof of the vehicle and a virtual line that links first vehicle sensor 24 and the front top edge of external object, and (b) the angle 45' between the roof of the vehicle and a virtual line that links second vehicle sensor 25 and the rear top edge of external object 42.

Figure 3:
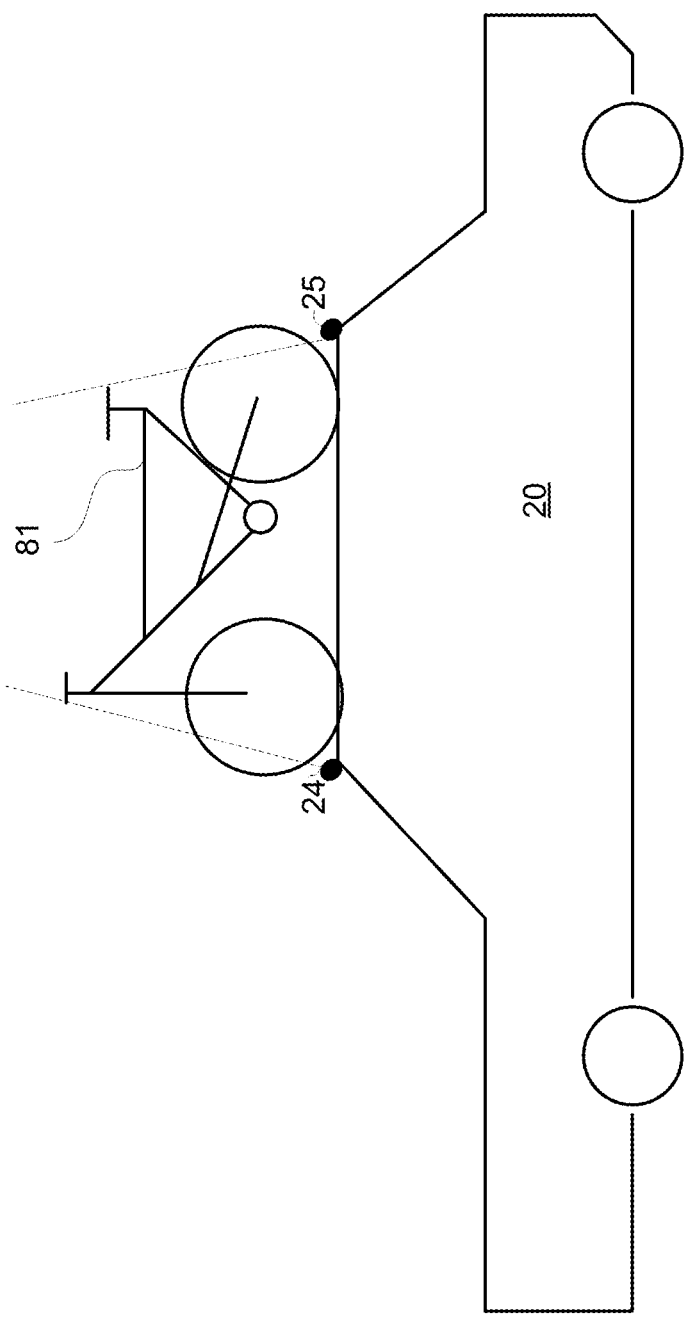
FIG. 3 illustrates an example of a vehicle, and an external object mounted to the top of the vehicle.

FIG. 3 illustrates a vehicle 20 and a bicycle 81 mounted on the roof of the vehicle.

The dimensions of the external object 42 can be learnt from (a) the angle between the roof of the vehicle and a virtual line that links first vehicle sensor 24 and the handle bar grip of the bicycle, and (b) the angle between the roof of the vehicle and a virtual line that links second vehicle sensor 25 and the saddle of the bicycle.

Figure 4:
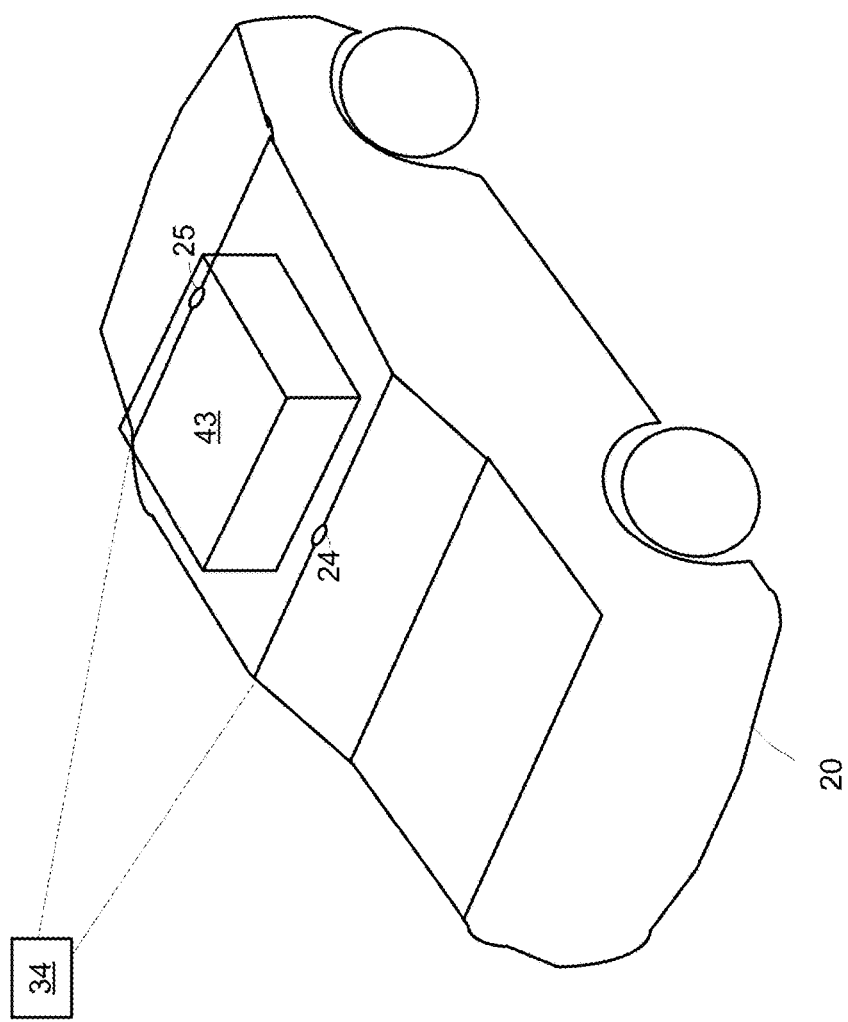
FIG. 4 illustrates an example of a vehicle, an external sensor, and an external object mounted to the top of the vehicle.

FIG. 4 illustrates a vehicle 20 and an external object 43 mounted on the roof of the vehicle.

The dimensions of the external object 43 and/or the dimensions of the vehicle 20 and/or the spatial relationship between the vehicle and the external object may be measured by external sensor 34 that it not attached to the vehicle. The external sensor may be fixed or movable.

Figure 5:
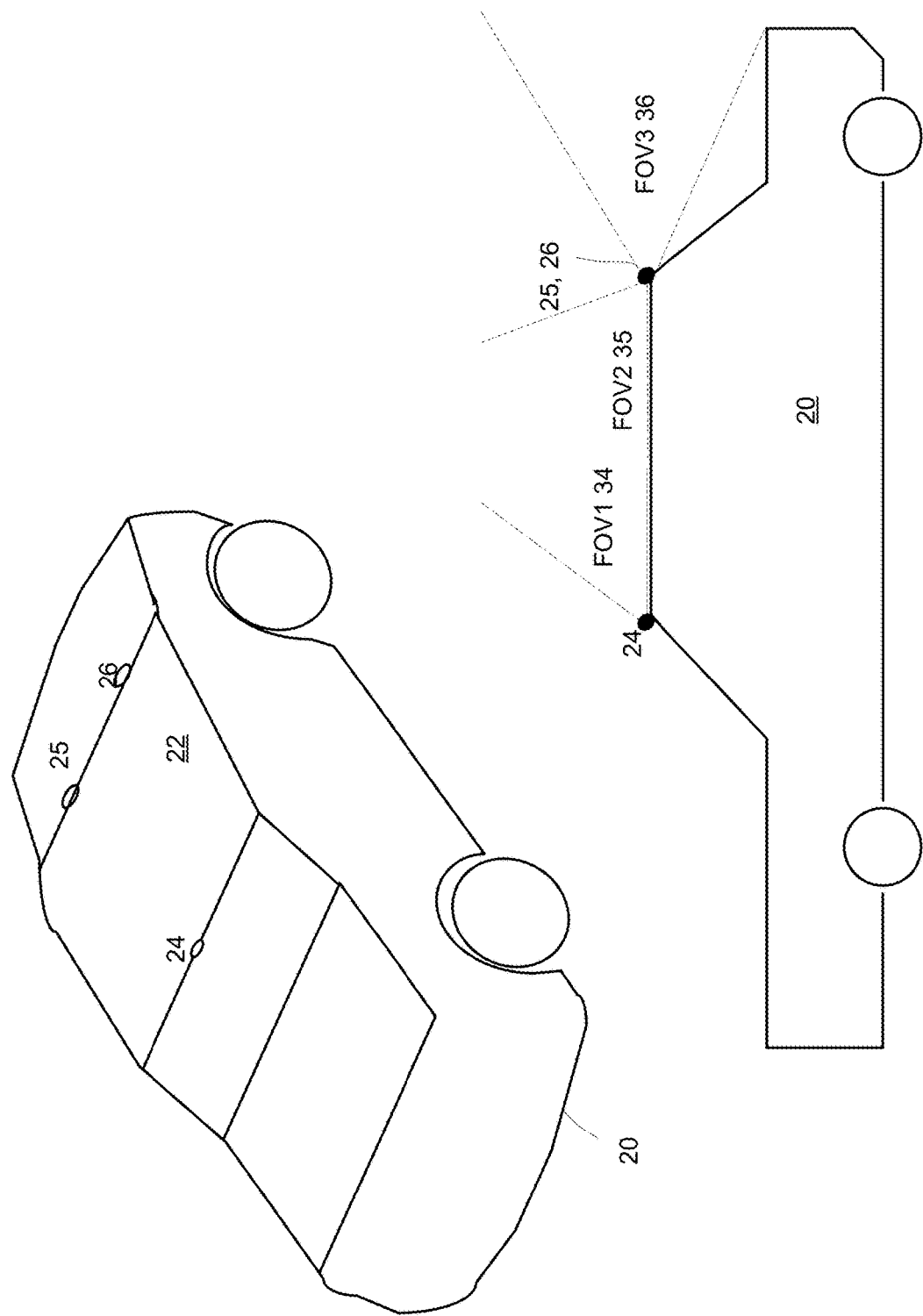
FIG. 5 illustrates an example of a vehicle.

FIG. 5 illustrates a vehicle 20 that includes a roof 22, first vehicle sensor 24 having a first field of view FOV1 34, second vehicle sensor 25 having a second field of view FOV2 35, and third vehicle sensor 26 having a third field of view FOV3 36.

FOV1 34 is directed backwards and covers the space above the roof.

FOV2 35 is directed forwards and covers the space above the roof.

FOV3 36 is directed backwards and covers the space behind the vehicle.

Figure 6:
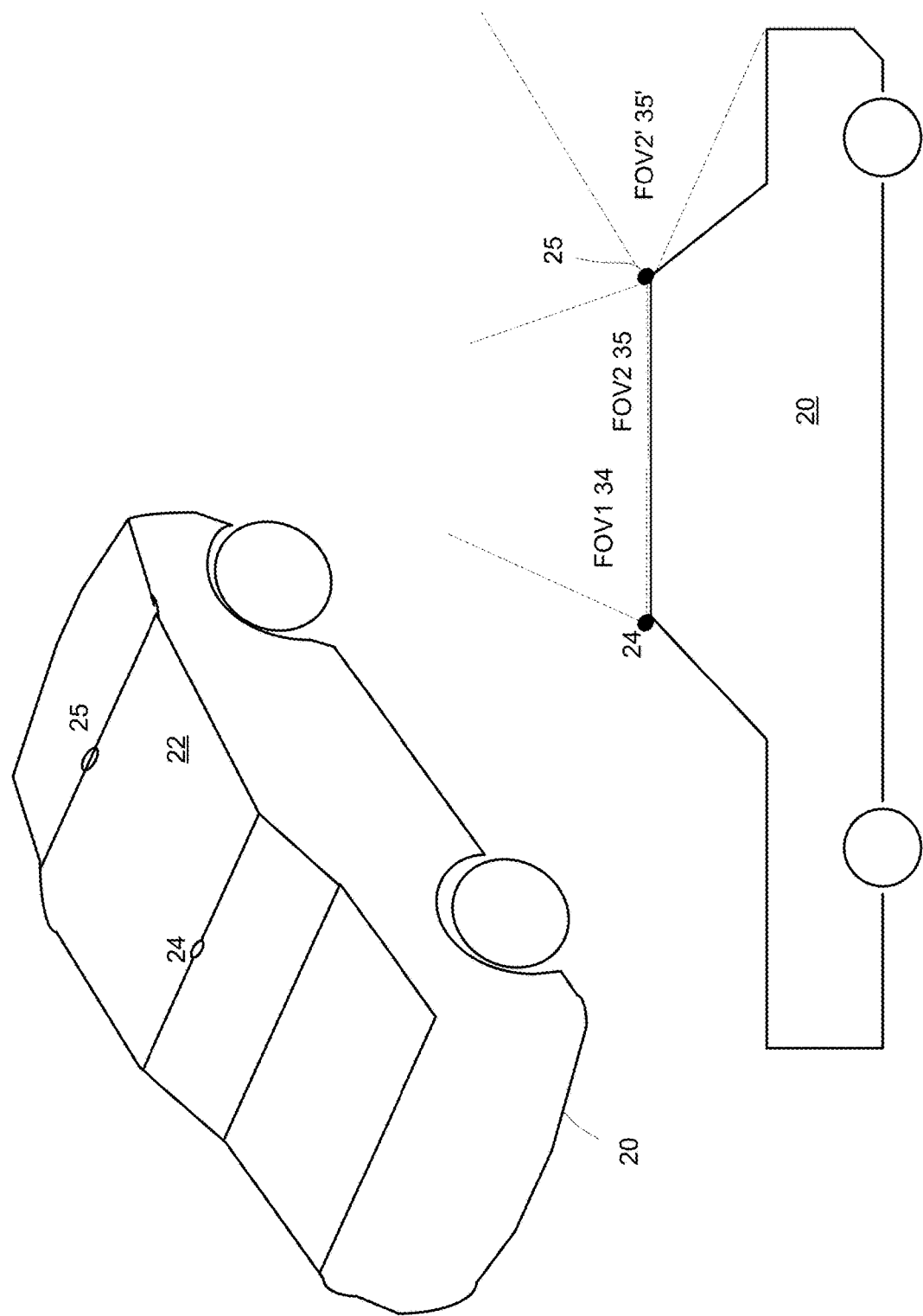
FIG. 6 illustrates an example of a vehicle.

FIG. 6 illustrates a vehicle 20 that includes a roof 22, first vehicle sensor 24 having a first field of view FOV1 34, second vehicle sensor 25 having a second field of view FOV2 35 and an additional field of view FOV2' 35'.

FOV1 34 is directed backwards and covers the space above the roof.

FOV2 35 is directed forwards and covers the space above the roof.

FOV2' 35' is directed backwards and covers the space behind the vehicle.

Figure 7:
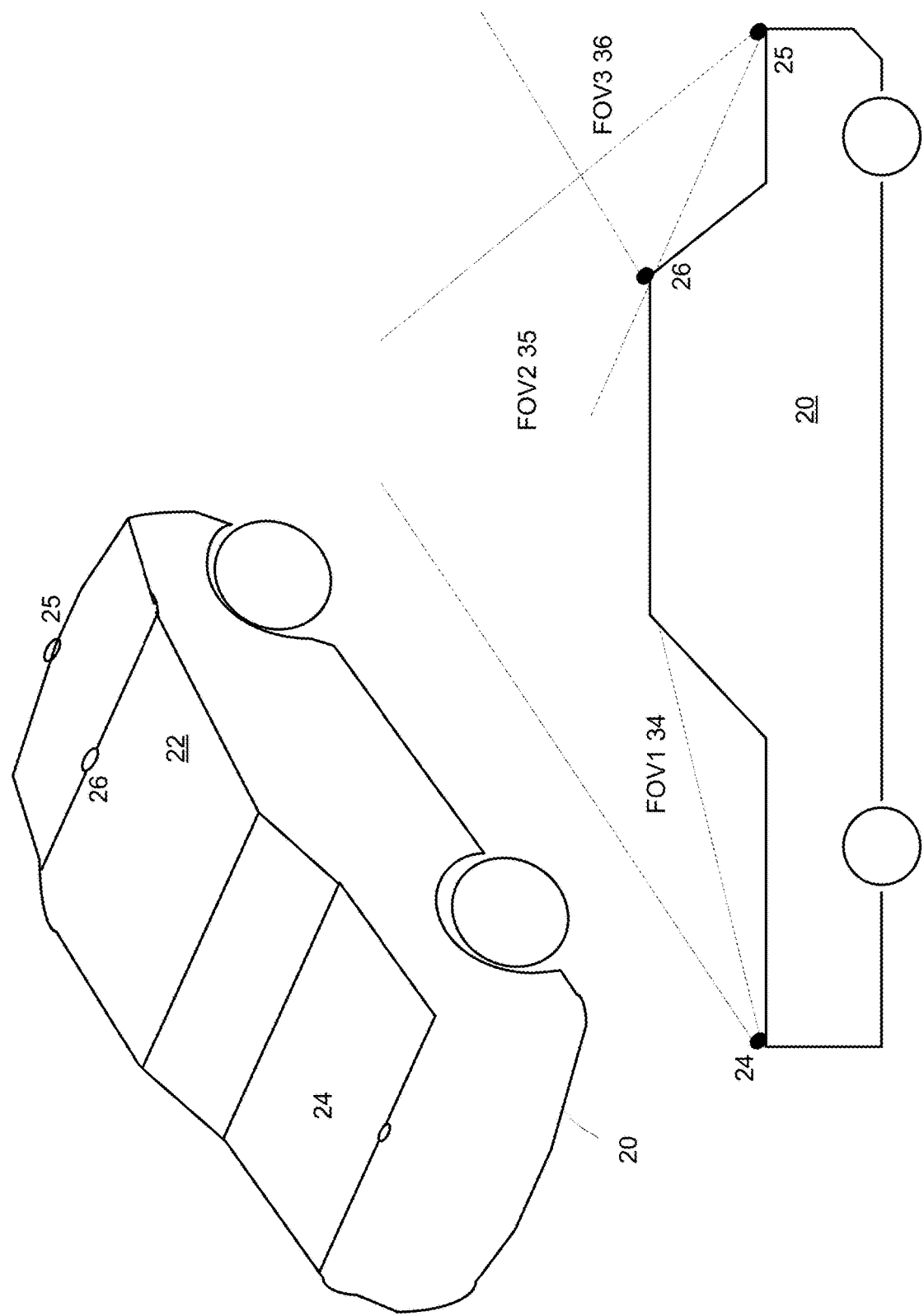
FIG. 7 illustrates an example of a vehicle.

FIG. 7 illustrates a vehicle 20 that includes a roof 22, first vehicle sensor 24 mounted at the front of the vehicle and having a first field of view FOV1 34, and second vehicle sensor 25 mounted at the read part of the vehicle having a second field of view FOV2 35 and an additional field of view FOV2' 35'.

FOV1 34 is directed backwards and covers the space above the roof.

FOV2 35 is directed forwards and covers the space above the roof.

Figure 8:
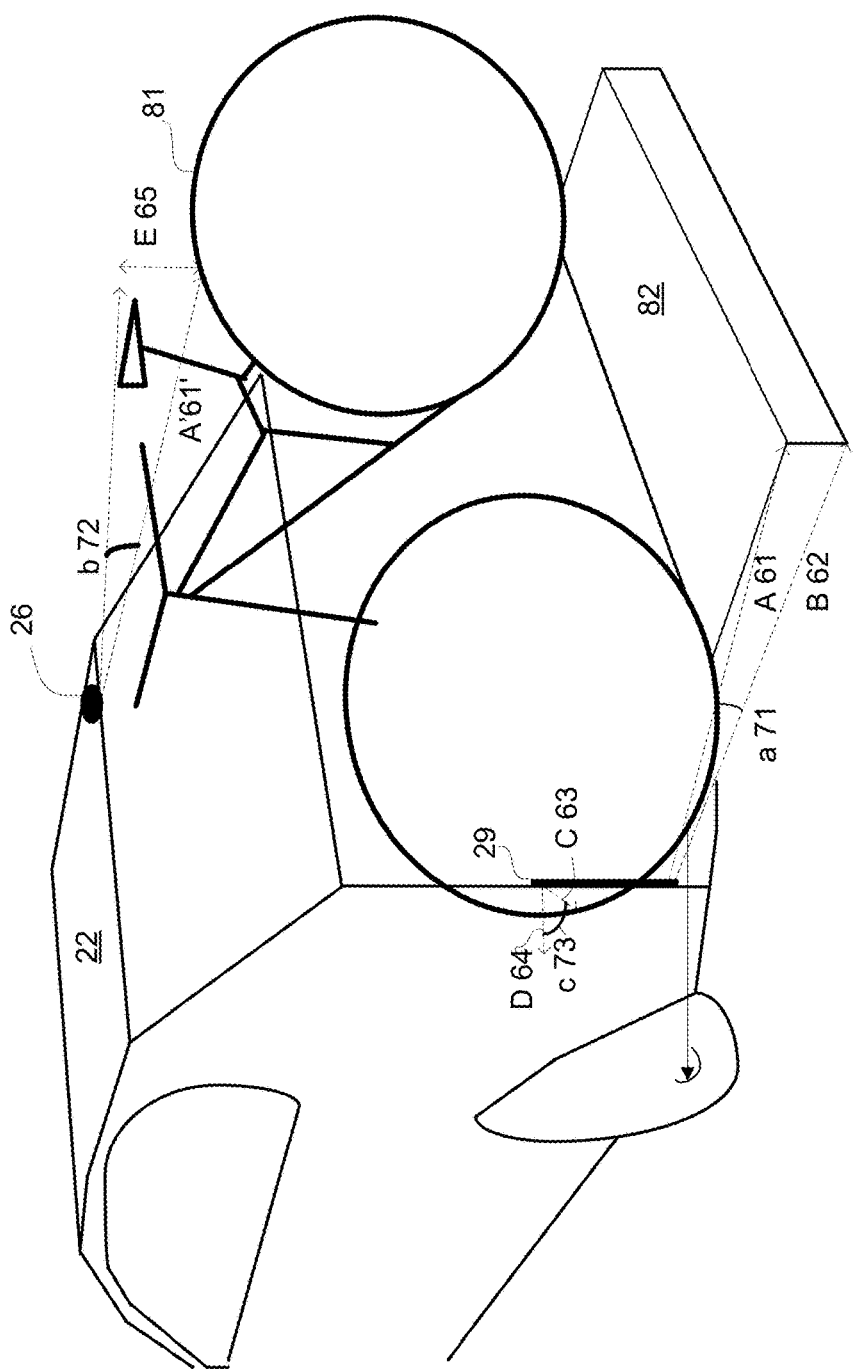
FIG. 8 illustrates an example of a vehicle, an bicycle rack trailer and a bicycle.

FIG. 8 illustrates an example of a vehicle, an bicycle rack trailer 82 and a bicycle 81. The bicycle trailer rack 82 is attached to the vehicle and supports the bicycle 81.

This figure illustrates an example of calculation of external element road clearance B 62, by knowing the external element length A 61, or by measuring the external element length A 61 with a vehicle sensor 29 (lidar and camera or only camera). The vehicle sensor 29 will see the first clear view line to the road, and give the angle a 71. The maximum distance B 62 will be A*tan (a).

The calculation of the outer edges of bicycle 81 may include measured the length C 63 by the vehicle sensor 29, the angle c 73 will be given by the camera. The side clearance D will be calculated as D=C*tan(c)

Calculation of the height of the external element: A=A' 61' (from previous calculation). An additional vehicle sensor 26 may measure the angle of b 72 then E 65=A*tan(b), E may be bit higher than the external element. E can also be calculated accurately using a lidar sensor that will measure A' to the external element.

Figure 9:
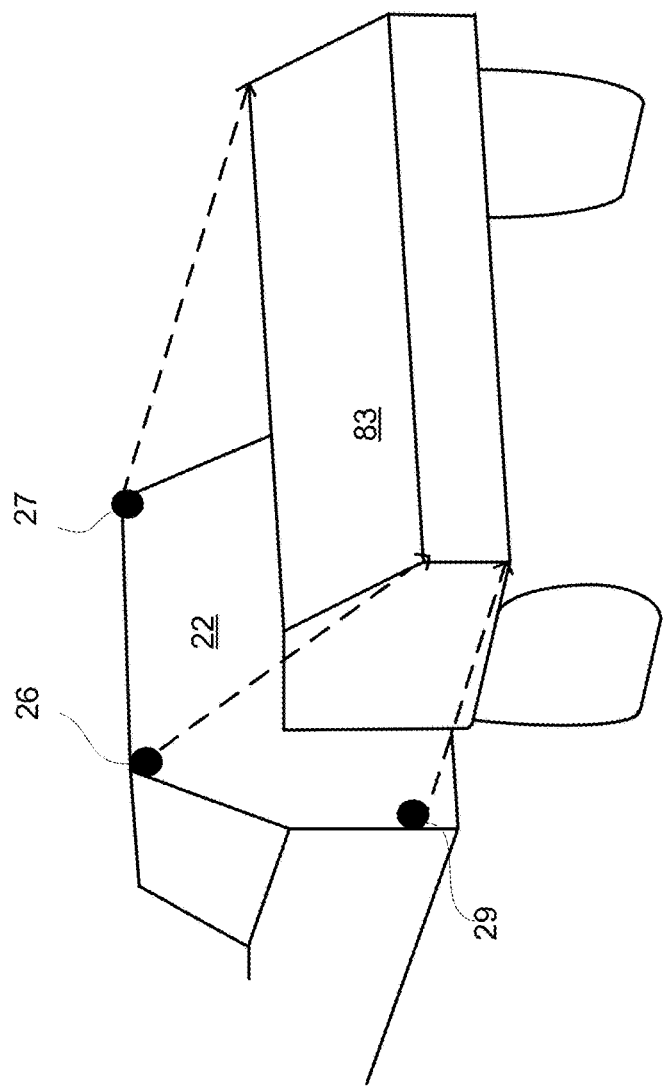
FIG. 9 illustrates an example of a vehicle, and a trailer.

FIG. 9 illustrates an example of a vehicle and three vehicles sensors 26, 27 and 29 that sense the dimensions of a trailer 83 attached to the vehicle.

Figure 10:
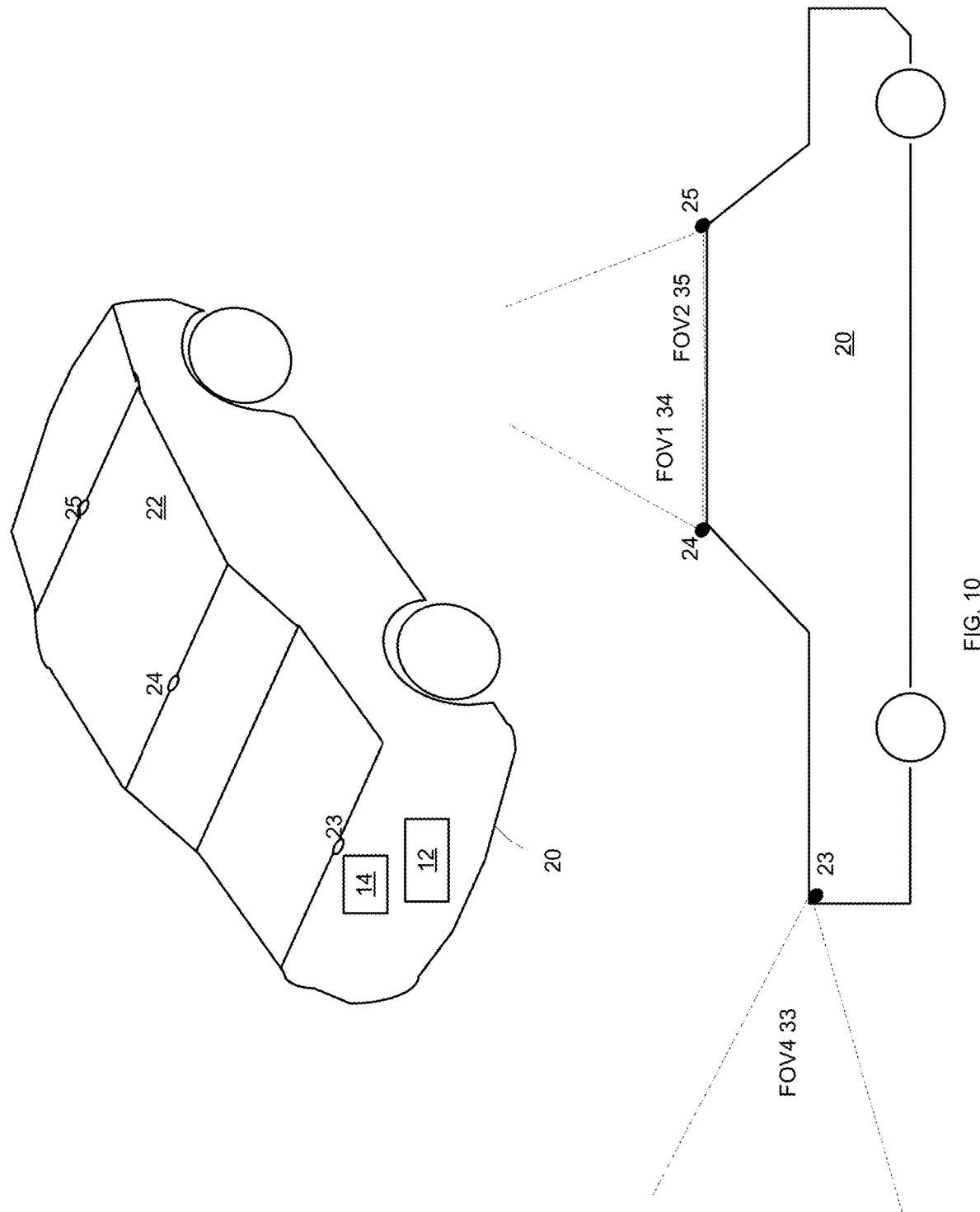
FIG. 10 illustrates an example of a vehicle.

FIG. 10 illustrates a vehicle 20 that includes a roof 22, first vehicle sensor 24 having a first field of view FOV1 34, second vehicle sensor 25 having a second field of view FOV2 35, and fourth vehicle sensor 23 mounted at the front of the vehicle having a fourth field of view FOV4 33.

FOV1 34 is directed backwards and covers the space above the roof.

FOV2 35 is directed forwards and covers the space above the roof.

FOV4 34 is directed forwards and covers the space in front of the vehicle. It may be used the sense the environment of the vehicle—for example the height of an incoming bridge, and the like.

Figure 11:
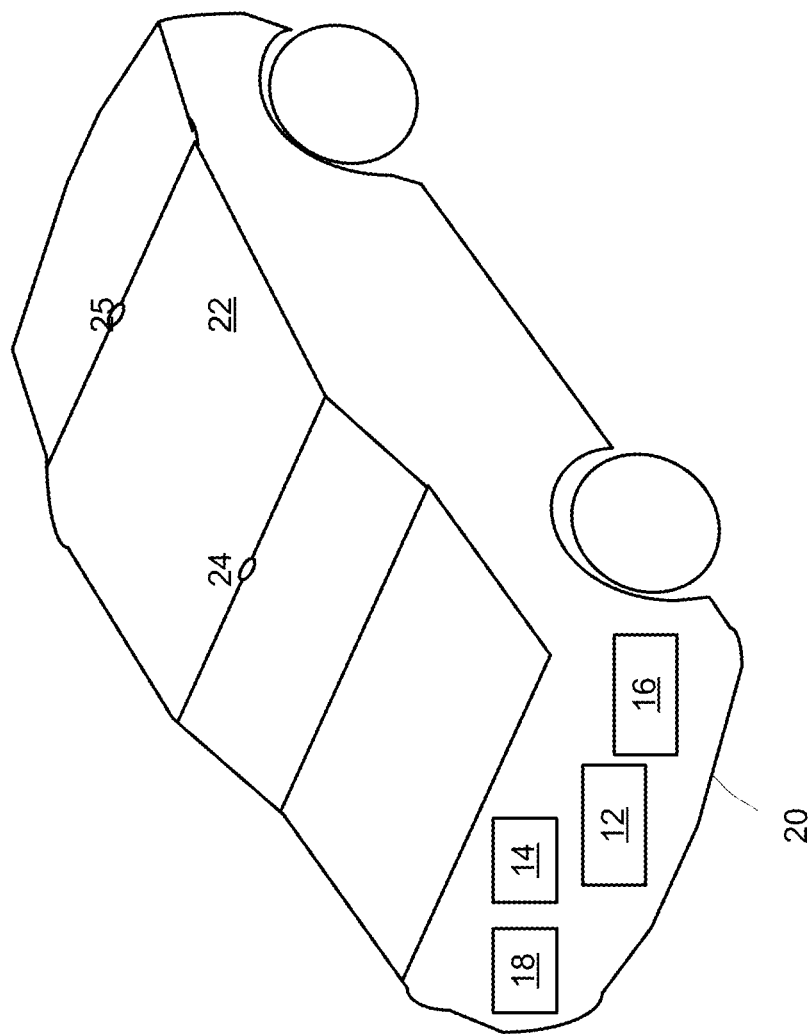
FIG. 11 illustrates an example of a vehicle.

FIG. 11 illustrates a vehicle 20 that includes a roof 22, two vehicle sensors 24 and 25 mounted on the roof (and having fields of views FOV1 34 and FOV35 respectively) that cover the space above the roof.

Vehicle 20 is illustrated as including a driving system (autonomous or non-autonomous) 12, communication module 14, vehicle computer 16 and weight sensor 18 for measuring the weight of the vehicle.

Figure 12:
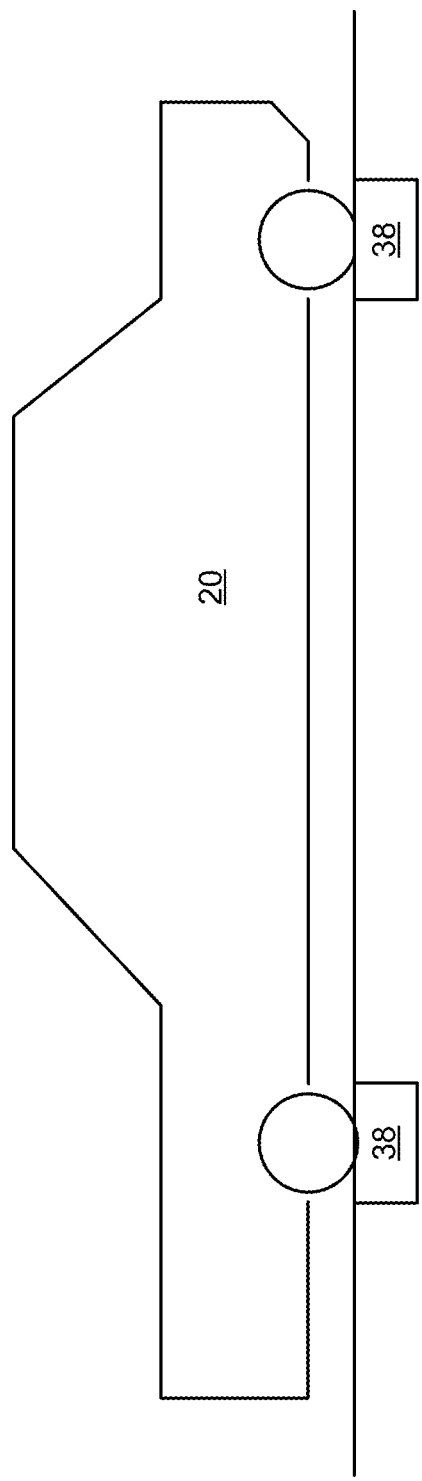
FIG. 12 illustrates an example of a vehicle and external weight sensors.

FIG. 12 illustrates a vehicle 20 that passes over external weight sensors 38—that are located within a road. The weight sensors may be buried.

Figure 13:
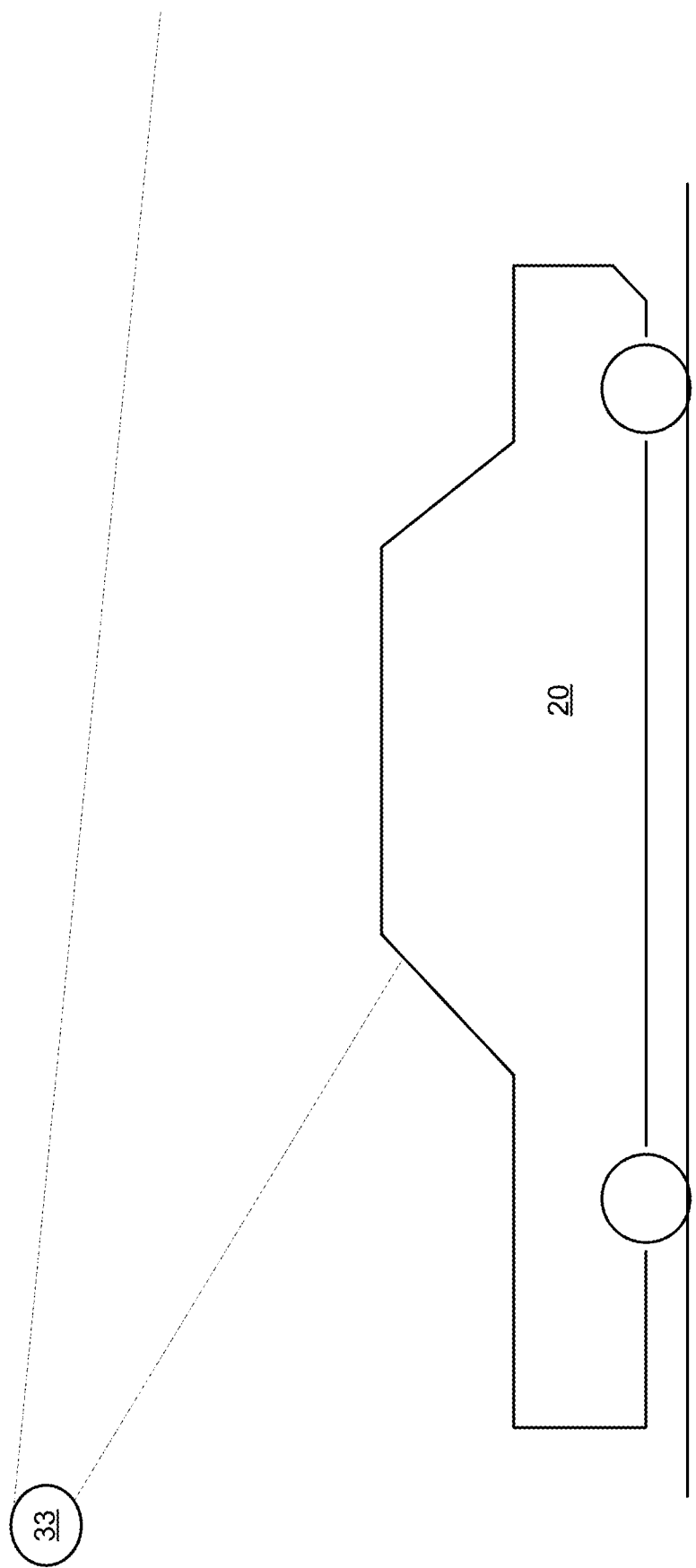
FIG. 13 illustrates an example of a vehicle and an external sensor.

FIG. 13 illustrates a vehicle 20 that passes through a field of view of an external sensor 33 (such as a camera, lidar, radar, and the like) that may measure the external object.

Figure 14:
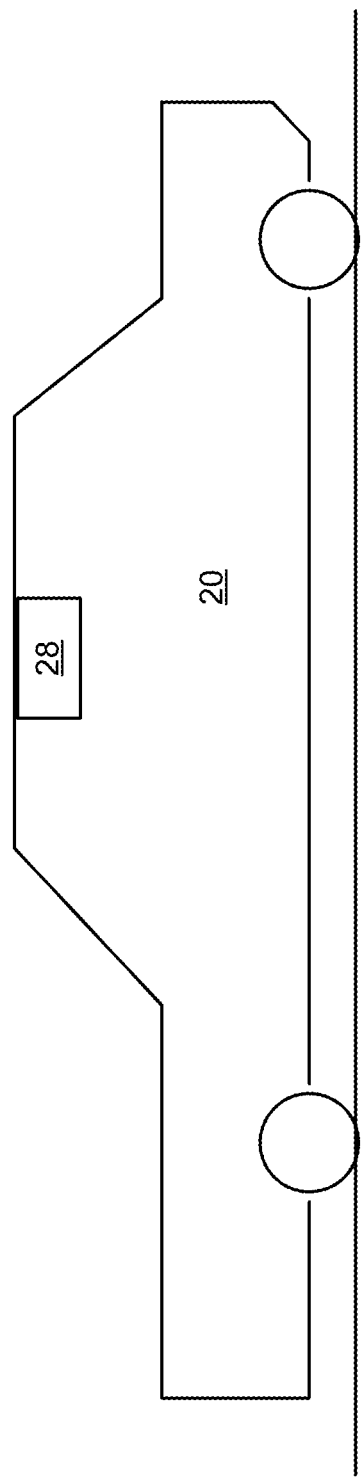
FIG. 14 illustrates an example of a vehicle and a roof pressure sensor.

FIG. 14 illustrates an example of a vehicle 20 and a roof pressure sensor 28 that is configured to indirectly measure the weight of an external object mounted on the roof.

Attaching a trailer to the vehicle

The system will detect changes to the vehicle's free space and dynamics and report them to the autonomous driving system—or respond in any other manner Problems that might be resolved by the system:
a. Rough road surface obstacles.
b. Sharp turns.
c. Narrow roadways.
d. Miscalculation of vehicle length causing intrusions into intersections.
e. Junction crossing.
f. Road clearance.
g. Insufficient breaking distance.
h. Miscalculation of trajectory when passing.

Detection

Detection of changes to the vehicle's physical properties can be by sensors on the vehicle body and/or not on the vehicle body.
a. Sensor on the vehicle that senses the presence of an external object.
b. Cameras on the vehicle that take images of the external object.
c. Active sensors (lasers) on the vehicle that can detect the addition of a trailer.
d. Weight sensors on the vehicle that measure the weight of an external object.
e. Cameras not on the vehicle that take images of the external object, such as phone cameras.
f. Weight sensors on the ground beneath the vehicle that measure the weight of the trailer.

Estimation

Estimation of the changes to the vehicle's physical properties can be accurate measurements, or estimation of safety limits. Estimation can be made by combinations of sensors on the vehicle, and not on the vehicle. In particular, for a trailer, it is critically important to update the space occupied by the vehicle.

The distance from the road calculation is the same as the example above. The trailer length will be measured by a lidar above. The lidar will measure the distance of the trailer from the vehicle to calculate the maximum turning radius.

The trailer estimations will be reported to the autonomous driving system similarly to the reporting of the roof external object. In the case of a trailer, particularly important information to update are the new occupied and the road clearance.

As before, it will be the task of the autonomous driving system to take into account changes to the vehicle's physical properties. This can include, changing the driving path to avoid obstacles, altering the motion control to account for longer stopping distances, and reporting hazards. One pertinent example, is safe crossing of a junction. It is important for the vehicle itself, and for other vehicles (crossing vehicles) to be aware of the changed physical dimensions and dynamics of the vehicle.

Attaching a trailer to a truck

The system will detect changes to the truck and trailer's free space and dynamics and report them to the autonomous driving system.

Problems that might be resolved by the system:
a. Rough road surface obstacles.
b. Sharp turns.
c. Narrow roadways.
d. Miscalculation of vehicle length causing intrusions into intersections.
e. Junction crossing.
f. Road clearance.
g. Insufficient breaking distance.
h. Miscalculation of trajectory when passing.

Figure 15:
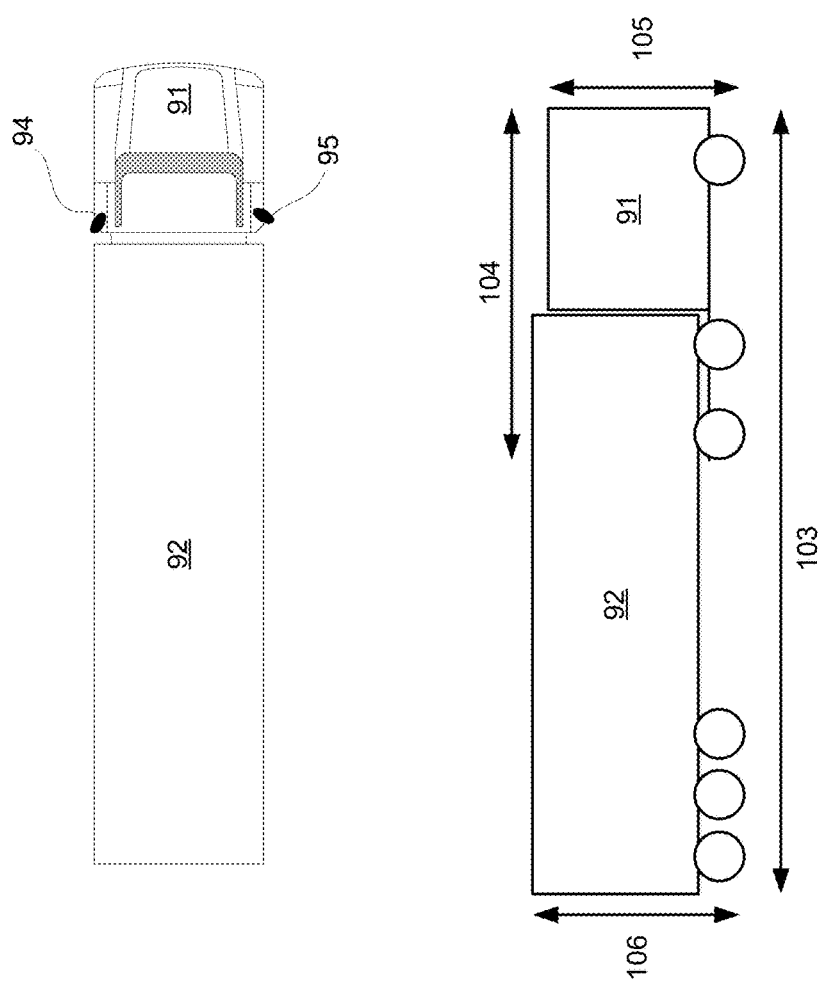
FIG. 15 illustrates an example of a vehicle.

FIG. 15 illustrates a truck 91 and a trailer 92 that is mounted on the truck. FIG. 15 illustrates the length (104) of the truck without the trailer and the length (103) of the truck when the trailer is mounted on the truck. FIG. 15 illustrates the height (105) of the truck 104 without the trailer and the length (106) of the truck when the trailer is mounted on the truck. FIG. 15 also illustrates vehicle sensors 94 and 94 for sensing the trailer.

Figure 16:
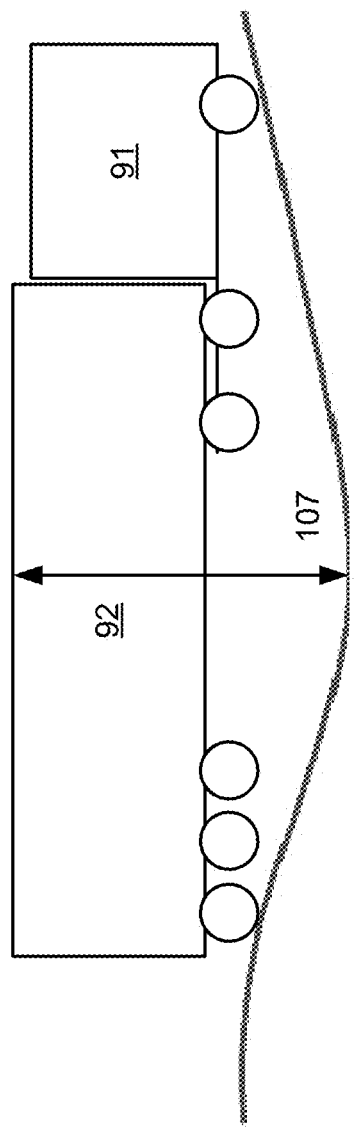
FIG. 16 illustrates an example of a vehicle and a path that has a curved height profile.

FIG. 16 illustrates a truck 91 and a trailer 92 that drive over a path segments of a curved height profile thereby causing the effective height 107 between the lower part of the path and the top of the trailer—to exceed the actual height of the truck.

Figure 18:
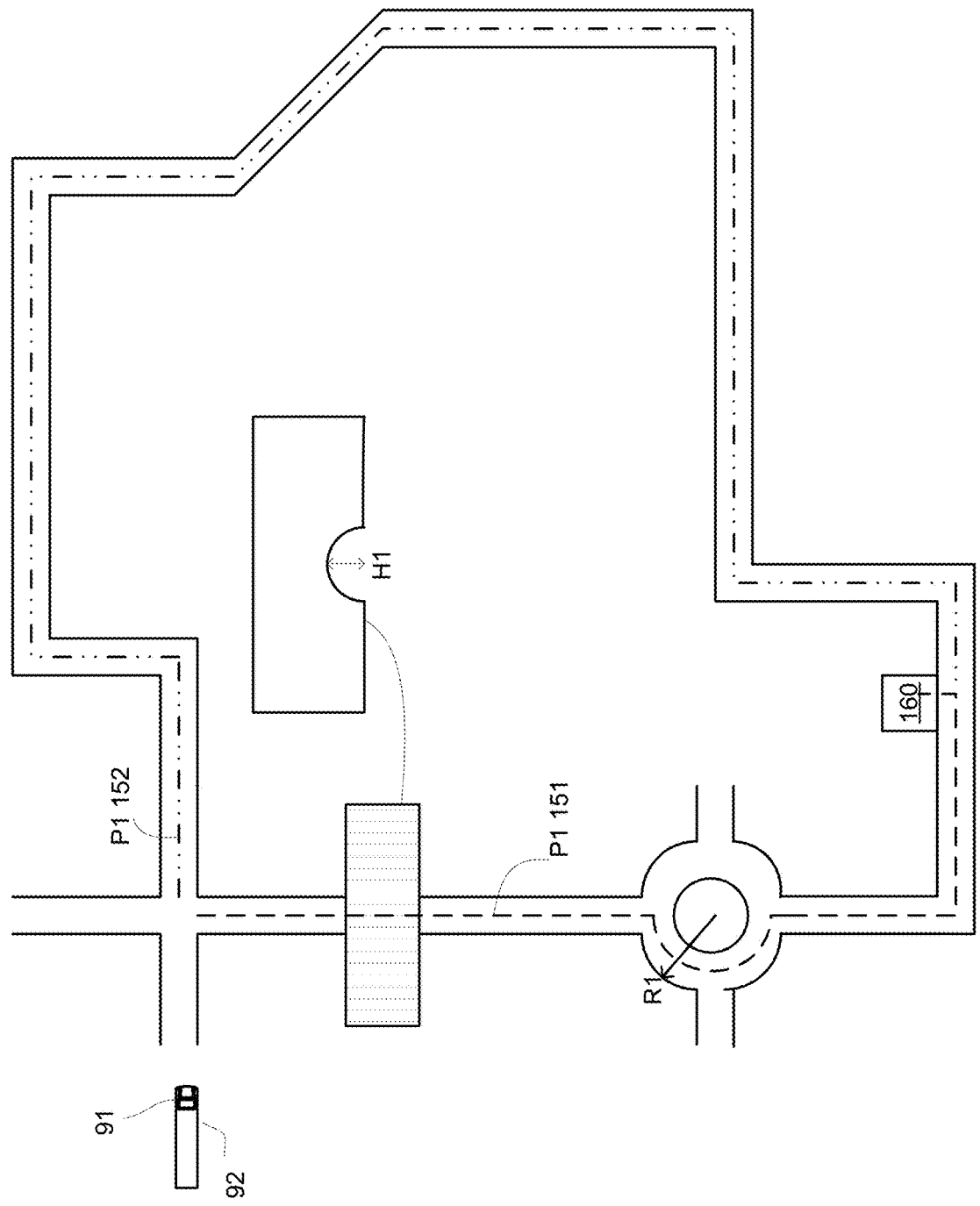
FIG. 18 illustrates an example of two paths and a vehicle.

FIG. 18 illustrates an example of two paths and a vehicle.

The vehicle is a truck 91 that carrier a trailer 92 and need to reach a destination 160.

The first path P1 151 is much shorter second path P2 152—but the first path includes potential obstacles such as a passageway of height H1 and a roundabout of radius R1 that may be too small for the truck. In this case the vehicle mays elect (or suggest the driver) to drive through the second path.

The system may detect all the truck and trailer configuration parameters, including the number of trailers, their length, whether they are connected or disengaged, and the number and location of the axles. The behavior of the perception and driving systems depend on the truck and trailer configuration. The detection may include detecting an identifier of the trailer (serial number, model type, unique dimension or configuration) and then use a mapping between the identifies and the properties of the trailer. The mapping may be stored in the vehicle or elsewhere.

The trailer may include (or may be attached to) a communication unit that may inform the truck (or other control unit or processor) the dimensions and/or other parameters (such as weight) of the trailer.

Turning around the driving path—in order for the truck and trailer system to turn successfully, the perception system needs to make accurate measurements of the available freespace. Accurate measurements can be made using a set of sensors, including at least one active measurement sensor such as a lidar.

Effective height—connecting trailers to a truck changes its height, and clearance. The perception system needs to sense this change and react accordingly. The characterization of "obstacle" is altered to adapt to the change in height and clearance.

For example, an object that the truck without trailer may have been able to drive over before attaching the trailer system, is now impassable, and defined as an obstacle. Similarly, a bridge that the truck alone may have been able to pass under, blocks the truck and trailer system.

The curvature of the path may change the effective height of the truck. Because of its length, the effective height of the truck and trailer above the ground is different from what might be expected. In particular, it might be different from the height limitation written on the bridge. In this case, the system may be configured to make an accurate measurement of the ground topography in front of the truck, and then use its knowledge of the truck and trailer configuration parameters, to estimate the effective height as the truck passes under the bridge.

Figure 17:
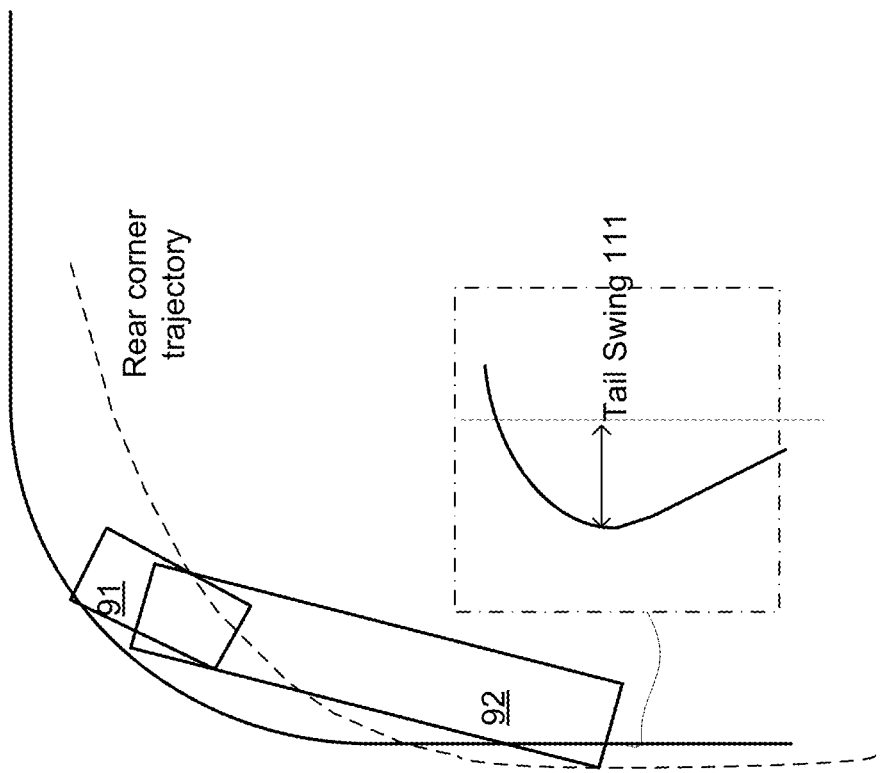
FIG. 17 illustrates an example of a driving pattern of over a curved path.

Rear overhang and tail swing—rear overhang and tail swing (denoted 111 in FIG. 17) need to be taken into account in path planning. The perception system needs to detect and measure accurately, static and dynamic object s in the path of the truck rear overhand and tail swing. Such static and dynamic objects cannot be assumed to be in known classes of object s, so there is a need for a perception system able to detect "unknown small obstacles". An example of such a perception system is one based on 3D reconstruction using at least one camera and at least one active measurement sensor, such as a lidar.

Figure 19:
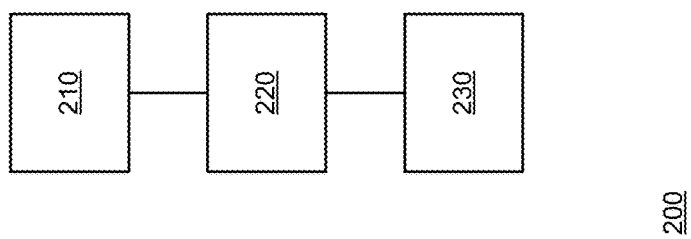
FIG. 19 illustrates an example of a method.

FIG. 19 illustrates method 200.

Method 200 may be for managing a change in a physical property of a vehicle due to an external object that is attached to the vehicle.

Method 200 may include steps 210, 220 and 230. These steps may be executed in a sequential manner or in any other manner.

Step 210 may include receiving information regarding the external object and a relationship between the external object and the vehicle; wherein at least part of the information is sensed information that is sensed by a sensor.

Step 210 may include sensing the sensed information. The sensed information may be sensed by one or more vehicle sensors and/or by one or more external sensors not attached to the vehicle.

The sensed information may be provided by the external object—by a communication module of the external object and/or by a sensor of the external object. For example—a trailer may inform the track that tows the trailer about the dimensions or any other parameter of the trailer.

Step 210 may include receiving information such as a mapping between a trailer identifier and design information or any other information that may include one or more properties of the trailer, receiving path information regarding the curvature of the path, the height profile of the path, passageways, bridges, height and widths of parking lot openings, gates, and the like.

Step 210 may include sensing the sensed information by one or more vehicle sensors.

The one or more vehicle sensors may be mounted on a top of the vehicle or in any other location.

The one or more vehicle sensors may include a weight sensor.

The one or more vehicle sensors may include an active sensor (such as radar, sonar or lidar).

The one or more vehicle sensors may include a passive sensor (such as a camera).

Step 220 may include determining, based on the information, an effect of the external object on the vehicle. The effect may include the dimensions, weight, breaking distance, fuel consumption, maximal speed, turn radius and the like of the vehicle (when supporting the external object).

Step 220 may be executed by a vehicle computer—a computer that is installed in the vehicle. Step 210 may include receiving the sensed information by the vehicle computer 16. The sensed information may first be received by the a communication module 14 of the vehicle.

Step 230 may include responding to the effect of the external object on the vehicle. The responding may be executed by the vehicle.

The responding may include adapting at least one autonomous driving pattern of the vehicle to the effect of the external object on the vehicle.

The responding may include planning a future driving path of the vehicle based on the effect of the external object on the vehicle.

The responding may include alerting a driver about the effect of the external object on the vehicle.

The responding may include preventing a vehicle (for example by stopping the vehicle, by not entering the path autonomically, by warning the driver to to driver over a path, and the like) from progressing along a driving path that was drivable without the external object and is undrivable with the external object.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Any reference to any of the terms "comprise", "comprises", "comprising" "including", "may include" and "includes" may be applied to any of the terms "consists", "consisting", "consisting essentially of". For example—any of the circuits illustrated in any figure may include more components that those illustrated in the figure, only the components illustrated in the figure or substantially only the components illustrate din the figure.

Also for example, in one embodiment, the illustrated examples may be implemented as circuitry located on a single integrated circuit. Alternatively, the examples may be implemented as any number of separate integrated circuits or separate common mode noise chokes interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for autonomously adapting a driving path of an autonomous or semi-autonomous vehicle when a trailer is attached to the vehicle, the method comprising:
   a. providing on the vehicle a sensor arrangement including one or more LIDAR sensors generating LIDAR data and one or more camera sensors generating camera data, the sensor arrangement including:
      i. at least one sensor having a field of view facing forward of the vehicle,
      ii. at least one of the LIDAR sensors having a field of view oriented toward a back of the vehicle, and
      iii. at least one of the camera sensors having a field of view oriented toward the back of the vehicle;
   b. providing a vehicle computer and processing with the vehicle computer an output of the sensor arrangement including the LIDAR data and the camera data to:
      i. perform a 3D reconstruction of an environment around the vehicle, and
      ii. detect in the 3D reconstruction presence of a trailer connected to the vehicle and derive from the 3D reconstruction at least one of a width dimension, a length dimension, and a height dimension of the trailer;

c. implement, with the vehicle computer, a path planner configured for computing an autonomous or semi-autonomous driving path for the vehicle in the 3D reconstruction on a basis of a free-space parameter of the vehicle when no trailer connected to the vehicle is detected by the sensor arrangement;

d. in response to the detection of the trailer at step b(ii), communicating the at least one of the width dimension, height dimension, and length dimension to the path planner;

e. implementing with the path planner an adjustment of the free-space parameter of the vehicle on the basis of the at least one height dimension, length dimension, and width dimension to produce an adjusted free-space parameter; and f. computing a driving path in the 3D reconstruction on the basis of the adjusted free-space parameter.

2. The method of claim 1 wherein the vehicle computer stores a map, including identifying obstacles in the map that the vehicle cannot navigate as a result of the adjustment of the free-space parameter.

3. The method of claim 1 wherein the computing of the driving path includes avoiding a path that is not drivable due to the adjusted free-space parameter.

4. The method of claim 1 wherein the computing of the driving path includes accounting for a longer cross time of the vehicle when crossing a junction.

5. The method of claim 1 wherein the computing of the driving path includes calculating a different turning radius due to the adjusted free-space parameter.

6. The method of claim 1 including identifying in the 3D reconstruction map static and dynamic objects interfering with the trailer rear overhang or trailer tail swing.

7. The method of claim 1 including outputting a notification to a driver of the vehicle that a path drivable without the trailer is not drivable with the trailer.

8. A system for automatically adapting a driving path of an autonomous or semi-autonomous vehicle when a trailer is connected to the vehicle, the system comprising:

a. a sensor arrangement including one or more LIDAR sensors generating LIDAR data and one or more camera sensors generating camera data, the sensor arrangement including:
 i. at least one sensor having a field of view facing forward of the vehicle,
 ii. at least one of the LIDAR sensors has a field of view oriented toward a back of the vehicle, and
 iii. at least one of the camera sensors has a field of view oriented toward the back of the vehicle, b. a vehicle computer configured for:
 i. processing an output of the sensor arrangement including the LIDAR data and the camera data to:
  1. perform a 3D reconstruction of an environment around the vehicle,
  2. detect in the 3D reconstruction presence of a trailer connected to the vehicle and derive from the 3D reconstruction at least one of a width dimension, length dimension, and height dimension of the trailer,
 ii. implement a path planner configured for computing an autonomous or semi-autonomous driving path for the vehicle in the 3D reconstruction on a basis of a free-space parameter of the vehicle, when no trailer connected to the vehicle is detected by the sensor arrangement,
 iii. in response to detection of the trailer connected to the vehicle, communicating either one of the width dimension, the height dimension, and the length dimension to the path planner,
 iv. implementing with the path planner an adjustment of the free-space parameter of the vehicle on the basis of the height dimension, the dimension, and the width dimension to produce an adjusted free-space parameter,
 v. compute a driving path in the 3D reconstruction on the basis of the adjusted free-space parameter.

9. The system of claim 8, wherein the vehicle computer stores a map, the path planner being configured for identifying obstacles in the map that the vehicle cannot navigate as a result of the adjustment of the free-space parameter.

10. The system of claim 8, wherein in response to the adjustment of the free-space parameter, the path planner is configured to perform path computation that avoids a path that is not drivable due to the adjusted free-space parameter.

11. The system of claim 8, wherein in response to the adjustment of the free-space parameter, the path planner is configured for computing a driving path including accounting for a longer cross time of the vehicle when crossing a junction.

12. The system of claim 8, wherein in response to the adjustment of the free-space parameter, the path planner is configured for computing a driving path including calculating a different turning radius due to the adjusted free-space parameter.

13. The system of claim 8, wherein in response to the adjustment of the free-space parameter, the path planner is configured for computing a driving path including identifying in the 3D reconstruction map static and dynamic objects interfering with the trailer rear overhang or trailer tail swing.

14. The system of claim 8, wherein the path planner is configured for outputting a notification to a driver of the vehicle that a path drivable without the trailer is not drivable with the trailer.

* * * * *

UNITED STATES PATENT AND TRADEMARK OFFICE
CERTIFICATE OF CORRECTION

| | |
|---|---|
| PATENT NO. | : 11,292,483 B2 |
| APPLICATION NO. | : 16/287259 |
| DATED | : April 5, 2022 |
| INVENTOR(S) | : Youval Nehmadi et al. |

It is certified that error appears in the above-identified patent and that said Letters Patent is hereby corrected as shown below:

In the Claims

Column 14, Line 22, in Claim 8, delete "the dimension," and insert --the length dimension,--.

Signed and Sealed this
Twenty-ninth Day of August, 2023

Katherine Kelly Vidal
*Director of the United States Patent and Trademark Office*